Nov. 21, 1961 N. HAGEN 3,009,196
MANUFACTURE OF HOLLOW PLASTIC ARTICLES
Filed Aug. 14, 1958 3 Sheets-Sheet 1
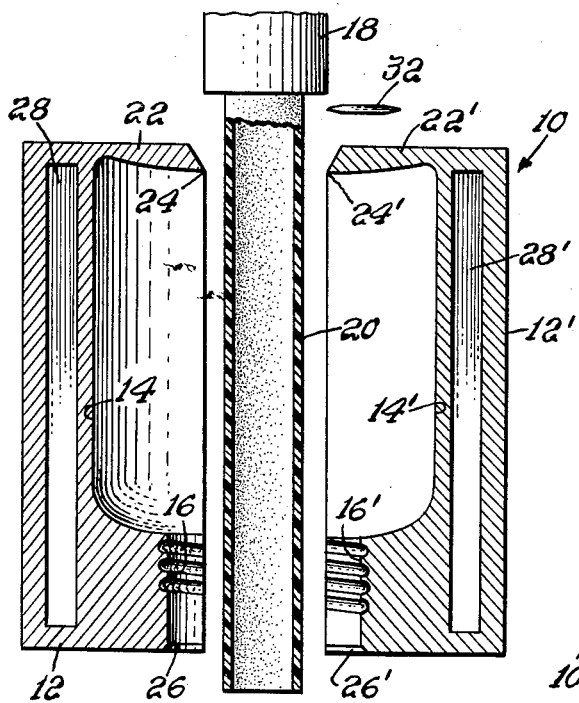
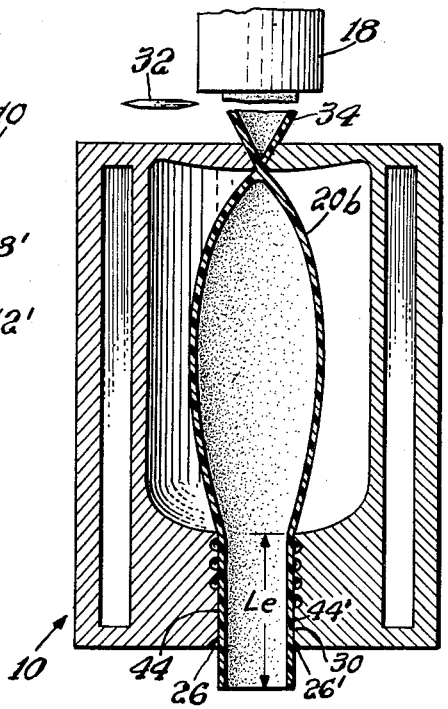
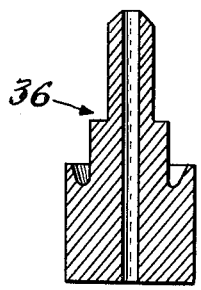
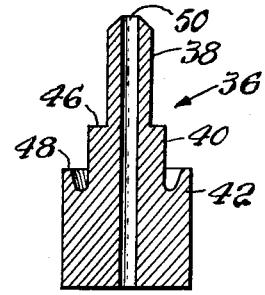
INVENTOR.
Norbert Hagen
BY Nov. 21, 1961   N. HAGEN   3,009,196
MANUFACTURE OF HOLLOW PLASTIC ARTICLES
Filed Aug. 14, 1958
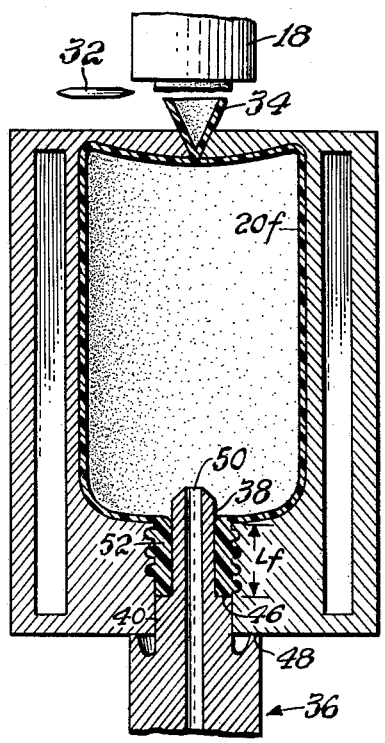
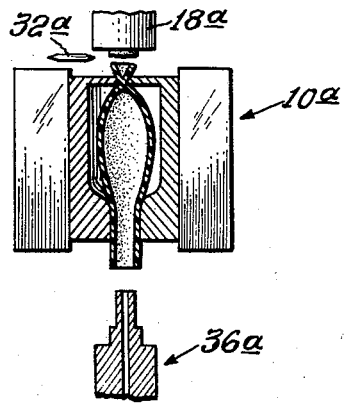
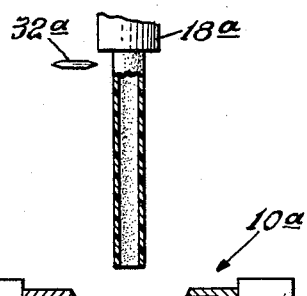
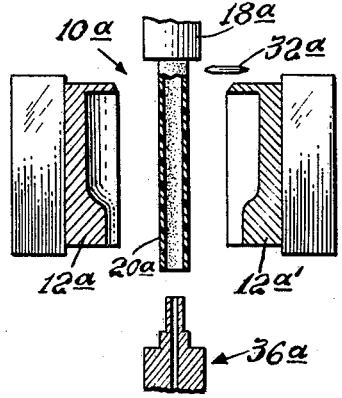
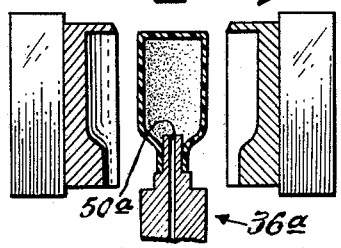
INVENTOR.
Norbert Hagen

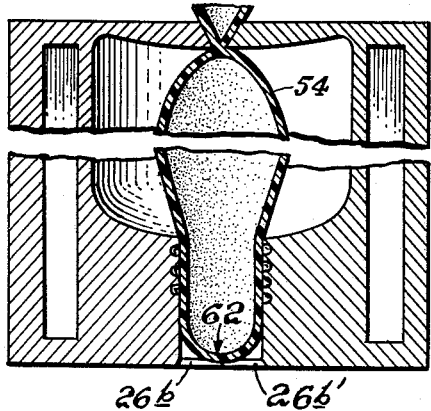
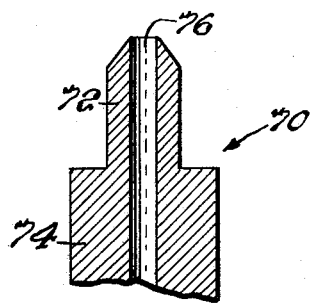
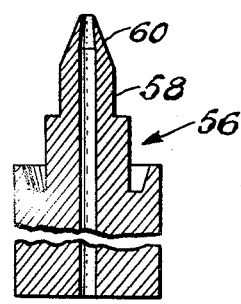
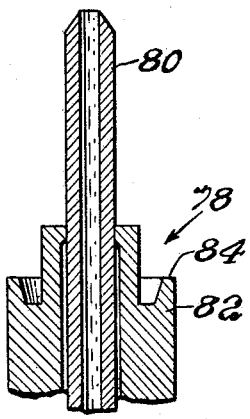
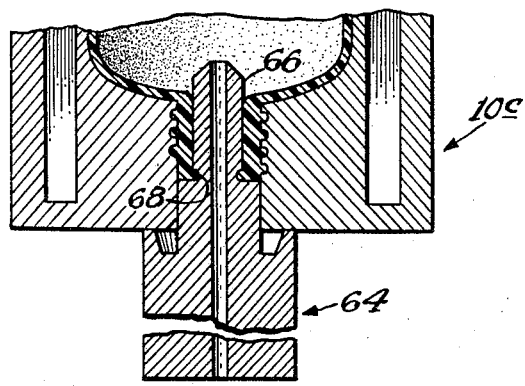
INVENTOR.
Norbert Hagen

United States Patent Office 3,009,196
Patented Nov. 21, 1961

3,009,196
MANUFACTURE OF HOLLOW PLASTIC ARTICLES
Norbert Hagen, Siegburg, Rhineland, Germany
(Stadtwaldstrasse, Kuppenheim, Murgtal, Germany)
Filed Aug. 14, 1958, Ser. No. 755,029
Claims priority, application Germany July 5, 1958
14 Claims. (Cl. 18—5)

This invention relates to the manufacture of bottles and other hollow articles from plastic materials, and more particularly to a process and an apparatus for blowing such articles. The term "hollow articles" is understood to comprise hollow bodies of any shape, provided the shape of the embryo article, while in condition of plasticity, permits its being blown by fluid pressure to the desired final shape. For the purpose of the invention, any plastic material may be used which is capable of being softened and becoming workable when heated at relatively low temperatures, and which, while soft and workable, may be expanded under fluid pressure into articles of desired shapes. The blown articles, upon cooling, become rigid.

A number of processes have heretofore been suggested to blow hollow articles from plastic materials, ordinarily starting with material in form of tubing, and numerous attempts have been made to provide suitable apparatus to carry out such processes.

The primary object of the present invention is to improve the manufacture of hollow plastic articles by blowing.

Generally, an extrusion press with an annular extrusion nozzle is mounted above a sectional mold, preferably a two-section mold. An open-ended tube is extruded into the space between the open sections of the mold to slip over a so-called blow pipe which projects into the open mold space from opposite the extrusion direction and in alignment with the extruded tubing. The blow pipe serves to admit compressed air or any other pressure medium into the embryonic article, and to act as a core to form an opening of the article being produced. As soon as a sufficient length of the open-ended tube is extruded, the mold sections are closed over a portion of the tube, which causes the tube to be pinched shut by the mold sections near the nozzle. At the tube end remote from the nozzle, the material is pressed against the blow pipe. Fluid pressure is then admitted through the blow pipe to expand the mold-enclosed tube portion against the wall of the mold cavity, where the molded article cools off and at the same time becomes rigid.

Thus, with the known methods and apparatus, making use of blow pipes, the mold sections not only close about a portion of the tube but also about the portion of the blow pipe, that is within the mold sections, and press-mold plastic material between the mold sections and the blow pipe. I have found that this kind of press-molding action has serious disadvantages, one drawback making itself especially felt when thin-walled articles are produced. In such cases, it is difficult, if not impossible, to achieve smoothness of the inner walls of bottle necks. It also happens that bottle necks of bottles produced in the known manner are not of uniform thickness. Further, due to the pinching off of excess material along the parting line of the mold sections along the neck portions of bottles, longitudinally extending incisions are often formed, which at times results in the formation of cracks and in leakages.

An important feature of the invention is, therefore, to overcome the drawbacks resulting from the known press-molding action, and to provide a process and an apparatus, which will ensure perfect smoothness of the inner walls of bottle necks and openings of hollow articles, uniform thickness of such walls, and will safely avoid the possible formation of cracks and leakages along the seams of bottle necks and openings of articles other than bottles. My present invention makes it possible to make bottle necks or any opening-forming portion of a hollow article of a thickness greater than that of the extruded formation.

To the accomplishment of the foregoing and other objects which will appear hereinafter, my invention generally provides extruding from an extrusion nozzle an organic plastic material in the form of a hollow formation to suspend vertically into the space between open sections of a mold, closing the mold, thereby pinching the extruded formation at a point near the nozzle and enclosing a segment of the formation, except for an opening in the closed mold, into which opening at least a portion at the free end of the formation extends, said opening being at a point remote from the nozzle, axially introducing a ram into the opening and thus axially upsetting plastic material, closing the mold opening, and press-molding the opening-forming portion of the article being produced, admitting fluid pressure to the fully enclosed segment, expanding the segment to the interior shape of the closed mold, opening the mold, and withdrawing the molded article.

The specification is accompanied by drawings in which:

FIG. 1 is a detail sectional view of an apparatus embodying features of the invention, showing a mold and an associate ram, the mold being shown in open condition and apart from the ram, with an open-ended tube being extruded into the open mold space;

FIG. 2 shows the same mold in closed condition;

FIG. 3 shows the same mold again in closed condition, with the ram being shown introduced in the mold;

FIGS. 4 to 6 illustrate the application of the present invention to an apparatus wherein extrusion nozzle and mold are movable in relation to each other, FIG. 4 showing the mold in open condition and close to the nozzle, the ram being apart from the mold, FIG. 5 showing the mold in closed condition and still close to the nozzle, the ram being, however, within the mold; and FIG. 6 showing the mold open and remote from the nozzle;

FIG. 7 is a fragmentary sectional view of a modified apparatus working with extruded closed-ended bubbles rather than with open-ended tubes;

FIG. 8 illustrates a modification of the ram according to the invention;

FIG. 9 shows another modification of the ram; and

FIG. 10 shows still another modification of the ram.

Referring to the drawings in greater detail now, and initially to FIGS. 1 to 3, a mold generally designated 10 consists of two sections or halves 12 and 12', shown in FIG. 1 in open condition. Each of the mold sections is provided with a cavity, and the cavities consist of a body portion 14 and 14', respectively, and a neck portion 16 and 16', respectively. In the particular embodiment selected for illustration in FIGS. 1 to 3, the two half-cavities are designed to form a bottle. There is an extrusion nozzle 18 which has an annular outlet orifice to extrude plastic material, such as polyethylene, polyvinyl chloride, in tubular shape and in a condition of suitable plasticity into the space between the open mold sections. The tube 20 is extruded in continuous operation to suspend vertically into the open mold space. As soon as the required length of tubing is extruded, the mold sections are closed. The upper surfaces 22 and 22' of the mold sections are beveled to form sharp edges 24 and 24', which edges are not necessarily intended to make a complete cut. They pinch the tube and excess material can easily be manually removed from the finished article. At the side of the mold remote from the nozzle, the mold has an opening 26, 26', which mold opening corresponds to the neck of the bottle to be produced. The mold sections are shown to be provided with fluid chambers 28 and 28' to cool the temperature of the mold.

In FIG. 2, the mold of FIG. 1 is shown in closed condition. The mold has been closed upon a segment of the tube, except for the mold opening 26, 26'. The tube segment within the mold, having been pinched at 24 and 24', has been converted into a bubble 20b closed at the top and open at the bottom, which bubble constitutes the embryonic form of the bottle to be blown. The tubular end portion 30 of the pinched off bubble is shown to extend into the neck portion of the mold and to project beyond the opening 26, 26'.

From FIG. 2 it will further be seen that the knife 32 shown in FIG. 1 on the right side of the tube has moved to the left and has severed, while moving, the segment enclosed by the mold from the parent body of plastic material in the nozzle. The severing is done upon the closing of the mold and across the bottom surface of the nozzle or at least so close to the nozzle as to be sure that the severed tube ends stay open. Excess material 34 will be removed from the finished bottle upon its withdrawal from the mold.

As far as the mold proper is concerned, it is of conventional design. It is an associate part of the mold that is generally identified by 36 and is referred to as a ram, that constitutes an important feature of the present invention. It is also the cooperation of mold and ram, that forms a part of the invention. The ram consists of three cylindrical parts of different diameters, parts 38, 40 and 42. Part 40 is dimensioned to be slidingly received within the mold walls 44 and 44', and part 38 is dimensioned to help form the inner wall of the neck of the bottle. The offset face or shoulder 46 has, according to the invention, an important function, as will be presently described. Part 42 is offset with respect to part 40 as the latter is offset with respect to part 38. The offset face 48 acts as a stop for the movement of the ram into the mold, as will be likewise explained. The body of the ram is provided with a passage 50 for the supply, for instance, of air under pressure.

In FIG. 3, the ram is shown in its operative position, while FIGS. 1 and 2 show the ram in its inoperative position. A comparison of FIG. 2 and FIG. 3 will make clear what has happened while the ram has been moved from its inoperative to its operative position. The length Le of the tubular portion 30 of the embryonic bubble (see FIG. 2) becomes reduced to the length Lf of the neck 52 of the finished bottle 20f (see FIG. 3). At the same time, the thickness of the tubular portion 30 which is identical with the thickness of the tube as extruded increases to the thickness of the bottle neck 52.

It is the face 46 which engages the bottom end of the referred to portion 30, the material of the bubble being still hot, soft and moldable, and upsets some of the plastic material of said portion, thereby thickening and shortening the original portion. The plastic material is crowded into the space intended for the bottle neck, and the bottle neck is formed by press-molding with the aid of the moving ram. The press-molding is done by the moving ram surfaces 38 and 46 and the stationary mold. More accurately, it is the outer surface of the ram part 38 and the surface 46 of part 40, which cooperate with the mold to form the bottle neck. The face 48 determines the distance of the entry of the face 46 and hence the length of the bottle neck.

While the above referred to severing of the enclosed segment from the parent body of plastic material must take place after the mold has been closed, it will be understood that the severing may take place before or while the ram is introduced into the mold opening, or even after the introduction.

Upon the closing of the mold, the formation of the bubble of FIG. 2, and the introduction and action of the ram, the embryo article is ready to be blown to the desired shape. The blown article is shown in FIG. 3. The blowing is done through the passage 50 in the ram 36, which passageway communicates with a pressure supply line.

Reverting to the known press-molding action, it should be understood that it was due to such action on relatively thin plastic material that the wall of bottle necks often became thinner than desired, either all around or at least partly. The present ram, on the other hand, due to its offset formation and the provision of the face 46 and due to its plunger-like use, ensures a perfact formation of bottle necks or openings in any hollow articles, of dimensions exactly as required. Thus, it is the main purpose of the ram of the invention to radically improve the press-molding of bottle necks, etc.

Having reference to FIGS. 4 to 6, which show an apparatus wherein the nozzle and mold are movable relatively to each other, in FIG. 4 a condition is shown which corresponds generally to that shown in FIG. 1, and the condition shown in FIG. 5 corresponds generally to that of FIG. 2. It will be appreciated that upon the extrusion of a tube 20a into the space between open mold sections 12a and 12a', as illustrated in FIG. 4, the mold sections are closed and pinch the tube at a point near the nozzle (see FIG. 5). It should be noted that the distance between extrusion nozzle 18a and mold 10a is the same in FIG. 4 and FIG. 5. While FIGS. 4 and 5 show the mold in its uppermost position, FIG. 6 shows the mold in its lowermost position. The extrusion of the tube into the open mold space, the closing of the mold, the pinching of the extruded tube, and the severing of the pinched off tube segment are all done while the mold in its uppermost position. The mold is then moved downwardly. The ram 36a is preferably inserted in the closed mold while the latter is still in its uppermost position either before or during or after the severing of the pinched off tube segment. Air pressure is admitted, preferably during the downward movement of the closed mold through the passage 50a. In the lowermost position, the mold opens, and the blown article is ready to be ejected. Then the open mold sections move upwardly to the uppermost position to be again closed upon another portion of freshly extruded tubing and thus to start a new cycle of operation. It is to be borne in mind that the extrusion continues while the closed mold moves downwardly, while the mold opens in the lowermost position, during the upward movement of the open mold sections, and during the closing of the mold in the uppermost position. In the apparatus of FIGS. 4 to 6, use is made of a ram as described with respect to FIGS. 1 to 3.

In the construction of FIGS. 4 to 6, the ram is provided to move together with the mold in either direction. It should, however, be noted that the ram need not move the same distance as the mold does. The ram may be introduced at a point intermediate the uppermost and lowermost positions of the mold. The ram does not have to partake in the mold movements at all; it may await the mold until the latter arrives at its lowermost position to be introduced in the mold opening, and it remains stationary while the open mold sections move upwardly to their uppermost positions.

It is, of course, also possible to use a blowing apparatus as described with respect to FIGS. 1 to 3 in connection with a rotary turret and to take advantage of the ram according to my present invention.

FIG. 7 illustrates a blowing apparatus designed for the handling of closed-ended embryo shapes. Plastic material is extruded in a tubular form from an extrusion nozzle (not shown). The leading end of the material, as it emerges from the nozzle, is closed. The closing is effected by a smearing action of a cut-off knife. The knife is not shown just as the nozzle is not shown. The mold 10b is shown in closed condition, enclosing a bubble 54 which is closed at both ends. The ram 56 is essentially similar to the rams 36 (FIGS. 1 to 3) and 36a (FIGS. 4 to 6) except that the part 58 tapers toward its free end, so that the tapering end portion 60 will be able to pierce the closed bubble end 62 when the ram is inserted in the mold opening 26b, 26b'.

In FIG. 8, a mold 10c is shown in association with a ram 64. The part of the ram is exteriorly provided with an annular depression 68 to form a mating inner ring at the outer end of the bottle neck.

It has been explained that the surface 48 of the ram 36 of FIGS. 1 to 3 serves as a stop. It will be recognized that the movement of the ram may be controlled in other ways. FIG. 9 shows a ram 70 which consists of two cylindrical parts, part 72 corresponding to part 38 (FIGS. 1 to 3), and part 74 corresponding to part 40 (see again FIGS. 1 to 3). There is no counterpart in the ram 70 of part 42 of FIGS. 1 to 3. The passageway 76 communicates with a gaseous or any other fluid pressure supply line.

It should be noted that rams as shown in FIGS. 1 to 8 may be made up of two or three separate parts, rather than being integrally made as a single-piece part. Similarly, a ram as shown in FIG. 9 may be composed of two separate parts. For instance, FIG. 10 shows a ram 78 which consists of two separate parts 80 and 82. Part 80 is dimensioned to help form the inner wall, for instance, of a bottle neck, and the surface 84 of the part 82 is intended to act as the face or shoulder 46 of the ram 36 of FIGS. 1 to 3 does. When using a ram as the one shown in FIG. 10, it is possible, once the mold has been closed over a segment of an extruded formation, to introduce into the mold the part 80 first and then the part 82 to do the upsetting.

It is believed that the method of my invention as well as the construction and operation of the apparatus for practicing the method, and the many advantages thereof, will be fully understood from the foregoing detailed description. In briefly reviewing the nature of the invention, it is pointed out that the ram is introduced into a closed mold, with the mold enclosing a pinched off segment of an extruded open or closed-ended formation. While it has been shown that the ram is moved into the mold opening, it must be understood that the mold may be moved toward the ram to make the ram enter the mold opening. In any event, the main task of the ram is to upset plastic material to form a bottle neck or any other opening-forming portio of a hollow article of any desired thickness, with smooth inner walls, and free of irregularities. For instance, it is easy, as has been pointed out hereinbefore, to form a bottle neck of a thickness greater than the thickness of the extruded shape (see, for instance, FIG. 8).

When working according to known blowing methods and with known apparatus, it was necessary to provide for a thickness of the extruded tube, which corresponded to the desired thickness of the neck of the bottle to be formed. My present invention makes it possible to extrude a tube of any wall thickness and yet to arrive at a bottle neck of any desired thickness, for instance, many times as great as that of the starting tube. Thus, my invention renders the blowing of plastic hollow articles more economical. Due to the upsetting action of the invention, it is further possible to accurately form a bottle neck or any opening-forming portion of a hollow article both on the inside and the outside, regardless of the thickness of the extruded tube. The invention permits accurate molding of screw threads, grooves, ridges, etc. It is the mold and/or the ram part 38 (see, for instance, FIG. 2) that are shaped to form a screw thread, groove, ridge, etc.

It should also be understood that, while I have shown narrow neck bottles, large neck ware and other blown articles may be formed according to the present invention. While it appears practical to extrude and work with tubular shapes, the invention is, of course, applicable to extruded shapes other than tubular ones. The operations of the closing of the mold, introduction of the ram, severing of the pinched off segment from the parent body of plastic material in the nozzle, etc. are automatically controlled in a predetermined sequence. Changes in the sequence are easily arranged. However, as has been indicated, it is essential that the ram is introduced into the closed mold after the mold has been closed and has enclosed a segment of the extruded formation.

It will be apparent that many changes and modifications, not shown or described, may be made without departing from the spirit of the invention defined in the appended claims.

I claim:

1. Apparatus for the manufacture of bottles and other hollow articles from organic plastic materials by blowing, the bottles and other hollow articles having a necklike part, including a sectional mold, an extrusion nozzle, and a ram, the mold sections forming when in closed condition a composite cavity conforming in shaft to the article to be blown and an opening leading from said cavity to the outside, said opening including a first portion adjacent said cavity and corresponding to the necklike part and a second or entrance portion, said first and second portions having substantially the same cross-sectional area, the extrusion nozzle being mounted above the mold to extrude a hollow formation to suspend vertically between the mold sections when open, said mold opening being on the side of the mold opposite to that nearest to the nozzle so that the extruded formation, at the free end thereof, will extend beyond said first opening portion, the ram being in alignment with the direction of extrusion and when in inoperative position below the mold, the mold and ram being movable relatively to each other, allowing the ram to enter the mold opening or to move from its inoperative to its operative position and vice versa, the ram having a longitudinal axis and including at least a first and a second part, the first part having a cross-sectional area smaller than the inner boundary of the extruded formation and thus being dimensioned to freely enter the extruded formation, the second part forming a face projecting from the first part outwardly and substantially perpendicularly to said axis, and being dimensioned to be slidingly received within said second opening portion, said face engaging, with said second part entering and moving in the second opening portion and with the projecting face coming to a stop between the first and second opening portions, the free end of the extruded formation, thereby axially upsetting the entire portion of the extruded formation which extends beyond the first opening portion and crowding the entire mass of said projecting portion into the first opening portion, the second part cooperating with the first part and the mold to press-mold within the first opening portion both the plastic mass from the first opening portion and the mass of the projecting portion, thus thickening and shortening the neck part, the ram being provided with a passageway to admit fluid pressure to the composite cavity.

2. In the apparatus according to claim 1, the first and second opening portions extending coaxially.

3. Apparatus for the manufacture of bottles and other hollow articles from organic plastic materials by blowing, the bottles and other hollow articles having a necklike part, including a sectional mold, an extrusion nozzle, and a ram, the mold sections forming when in closed condition a composite cavity conforming in shape to the article to be blown and an opening leading from said cavity to the outside, said opening including a first portion adjacent said cavity and corresponding to the necklike part and a second or entrance portion, said first and second portions having substantially the same cross-sectional area, the extrusion nozzle being mounted above the mold to extrude a hollow formation to suspend vertically between the mold sections when open, said mold opening being on the side of the mold opposite to that nearest to the nozzle so that the extruded formation, at the free end thereof, will extend beyond said first opening portion, the ram being in alignment with the direction of extrusion and when in inoperative position below the mold, the mold and ram being movable relatively to each other, allowing the ram to enter the mold opening or to move from its inoperative to its operative position and vice versa, the ram including two coaxially extending parts and a flat offsetting face between said parts, one of said two parts being centrally arranged and projecting from the other part, said central part being dimensioned to freely enter the extruded formation and to help confine a space between the outer wall of the central part and the inner wall of the extruded formation, the other part having substantially the same cross-sectional area as said second or entrance opening portion so as to be slidingly received therein, the offsetting face, with the ram moving within the mold opening and the offsetting face coming to a stop between the first and second opening portions, pushing the entire extruded material from the second opening portion forward into the first opening portion, thereby packing the plastic mass both from the first and the second opening portions into the first opening portion and press-molding the neck part, the ram being provided with a passageway to admit fluid pressure to the composite cavity.

4. Process for the manufacture by blowing of bottles and other hollow articles from organic plastic materials, the bottles and other hollow articles having a necklike part, comprising extruding from an extrusion nozzle a hollow formation to suspend vertically between sections of an open sectional mold, the nozzle being mounted above the mold, the sections of the mold confining, with the mold in closed condition, a cavity and an opening leading from the cavity to the outside, the opening being at a point remote from the extrusion nozzle and including a first portion adjacent said cavity and corresponding to the necklike part and a second or entrance portion, the first and second opening portions extending coaxially and having substantially the same cross-sectional area, the extrusion being continued until the free end of the extruded formation reaches beyond said first opening portion at least into said second opening portion, closing the mold, thereby pinching the extruded formation at a point near the nozzle and enclosing a segment of the extruded formation, axially introducing a ram into the mold opening, the ram including a laterally extending face to engage said free end, moving the ram within the mold opening until said face arrives between said first and second opening portions, having said face axially push all the plastic material from the second opening portion into the first opening portion, thereby safely preventing any plastic material from escaping from the second opening portion and closing the mold opening and press-molding the neck part within the confines of the first opening portion, admitting fluid pressure to the fully enclosed segment, expanding the segment to the interior shape of the closed mold, opening the mold, and withdrawing the molded article.

5. In the apparatus according to claim 1 for the manufacture of bottles and other hollow articles having a threaded necklike part, the mold having a screw-threaded and a smooth-walled neck portion, said neck portions defining said opening, the screw-threaded neck portion defining said first opening portion, and the smooth-walled neck portion defining said second opening portion.

6. In the process according to claim 4, severing the extruded formation from the parent body of plastic material at a point between the nozzle and the mold, the severing being done subsequently to the closing of the mold.

7. In the process according to claim 4, closing the mold while at a level nearest the nozzle, relatively moving, upon the introduction of the ram, the nozzle, as one part and the mold and ram, as opposite parts, apart, opening the mold upon admission of the fluid pressure, while in the moved apart position, withdrawing the article formed, and relatively moving the nozzle and the open mold sections and ram toward each other for a new cycle of operations.

8. In the process according to claim 4, closing the mold while nearest the nozzle, relatively moving the nozzle and the mold apart, introducing the ram into the mold opening during said relative movement, opening the mold upon admission of the fluid pressure, while in the moved apart position, withdrawing the article formed, and relatively moving the nozzle and the open mold sections toward each other for a new cycle of operations.

9. In the process according to claim 4, closing the mold while at a level nearest the nozzle, relatively moving the nozzle and the mold apart, introducing the ram into the mold opening, with the mold in the moved apart position, withdrawing the article formed, and relatively moving the nozzle and the open mold sections toward each other for a new cycle of operations.

10. In the process according to claim 4, extruding a tube, closing the leading end of the tube prior to the closing of the mold, closing the mold and thus enclosing a hollow bubble form closed at both ends, and introducing the ram, thereby piercing the closed bottom end of the bubble.

11. In the apparatus according to claim 1, the first part, with the ram in its operative position, extending into the composite cavity, the second part being of such height as will determine the length of the necklike part.

12. In the apparatus according to claim 1, the ram further including a third part, the first, second and third parts extending coaxially, the second part being of a larger diameter than and equidistantly offset with respect to the first part, the third part being of a larger diameter than and equidistantly offset with respect to the second part, the offsetting face between the second and the third part acting as a stop controlling the depth of the entry of the second part into the mold opening, the passageway being provided centrally of the first, second and third parts.

13. In the apparatus according to claim 1, the first part having a tapering end portion.

14. In the apparatus according to claim 1, said first and second parts being formed as separate parts.

References Cited in the file of this patent

UNITED STATES PATENTS

| | | |
|---|---|---|
| 2,783,503 | Sherman | Mar. 5, 1957 |
| 2,787,023 | Hagen et al. | Apr. 2, 1957 |
| 2,810,934 | Bailey | Oct. 29, 1957 |
| 2,928,120 | Leghorn et al. | Mar. 15, 1960 |
| 2,930,079 | Parfrey | Mar. 29, 1960 |

FOREIGN PATENTS

| | | |
|---|---|---|
| 1,029,586 | France | Mar. 11, 1953 |
| 744,927 | Great Britain | Feb. 15, 1956 |